US012177093B2

(12) United States Patent
Toeroe

(10) Patent No.: US 12,177,093 B2
(45) Date of Patent: Dec. 24, 2024

(54) METHOD FOR APPLYING A PENALTY TO A CLOUD SERVICE PROVIDER FOR IMPROVED MAINTENANCE OF RESOURCES ACCORDING TO A SERVICE LEVEL AGREEMENT (SLA)

(71) Applicant: Maria Toeroe, Montreal (CA)

(72) Inventor: Maria Toeroe, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/642,301

(22) PCT Filed: Sep. 13, 2019

(86) PCT No.: PCT/IB2019/057747
§ 371 (c)(1),
(2) Date: Mar. 11, 2022

(87) PCT Pub. No.: WO2020/254868
PCT Pub. Date: Dec. 24, 2020

(65) Prior Publication Data
US 2024/0223470 A1  Jul. 4, 2024

Related U.S. Application Data

(60) Provisional application No. 62/864,096, filed on Jun. 20, 2019.

(30) Foreign Application Priority Data

Jul. 24, 2019 (WO) .................. PCT/IB2019/056340

(51) Int. Cl.
*H04L 41/50* (2022.01)
(52) U.S. Cl.
CPC ............................ *H04L 41/5032* (2013.01)

(58) Field of Classification Search
CPC . H04L 41/5032; G06F 9/5077; G06F 9/5088; G06F 2201/81; G06F 11/1433; G06Q 10/06393; G06Q 30/01
See application file for complete search history.

(56) References Cited

U.S. PATENT DOCUMENTS 6,195,697 B1 * 2/2001 Bowman-Amuah ....................... H04L 41/5061 709/224
8,862,738 B2 * 10/2014 Madduri ............... G06F 9/5083 709/226

(Continued)

OTHER PUBLICATIONS

E. Casalicchio et al., Mechanisms for SLA provisioning in cloud-based service providers, Computer Networks 57 (2013) 795-810.

(Continued)

*Primary Examiner* — Javier O Guzman
(74) *Attorney, Agent, or Firm* — Julie Dufort; Ericsson Canada Inc.

(57) ABSTRACT

There is provided a method for applying a penalty to a cloud service provider, while upgrading resources in a system providing infrastructure-as-a-service (IaaS), for improved maintenance of resources according to a service level agreement (SLA), comprising iteratively: detecting a change in a number of expected resources or a number of provided resources; and upon determining that a previous unavailability event was ongoing, calculating the penalty for the previous unavailability event using a quadratic proportional function. The method also comprises computing a total penalty as the sum of the penalties for each previous unavailability event; and applying the total penalty to the cloud service provider of the IaaS. There is provided a method and network node for upgrading resources in a system based on dependencies and service level agreement (SLA) requirement including a penalty for outage of the (Continued)

resources, wherein calculating the penalty comprises using the quadratic proportional function.

12 Claims, 13 Drawing Sheets

(56) References Cited

U.S. PATENT DOCUMENTS

| | | | | |
|---|---|---|---|---|
| 10,152,357 | B1* | 12/2018 | Espy | G06F 11/3051 |
| 11,777,818 | B1* | 10/2023 | Paul | G06F 11/301 |
| | | | | 709/224 |
| 2004/0030777 | A1* | 2/2004 | Reedy | H04L 67/10 |
| | | | | 709/224 |
| 2005/0010456 | A1* | 1/2005 | Chang | G06Q 10/0639 |
| | | | | 705/7.38 |
| 2006/0112317 | A1* | 5/2006 | Bartolini | H04L 41/5067 |
| | | | | 714/47.2 |
| 2006/0130042 | A1 | 6/2006 | Dias et al. | |
| 2007/0043923 | A1* | 2/2007 | Shue | G06F 3/0644 |
| | | | | 711/170 |
| 2008/0046266 | A1* | 2/2008 | Gudipalley | G06Q 10/00 |
| | | | | 705/305 |
| 2008/0320482 | A1* | 12/2008 | Dawson | H04L 41/5009 |
| | | | | 718/104 |
| 2010/0114531 | A1* | 5/2010 | Korn | G06Q 10/06 |
| | | | | 702/186 |
| 2015/0312127 | A1* | 10/2015 | Leemet | H04L 41/5032 |
| | | | | 709/224 |
| 2017/0149627 | A1* | 5/2017 | Blondeau | G06F 9/455 |
| 2018/0067736 | A1* | 3/2018 | De Zaeytijd | G06F 8/65 |
| 2019/0215250 | A1* | 7/2019 | Báder | H04L 41/5019 |

OTHER PUBLICATIONS

S. Garg et al., SLA-based virtual machine management for heterogeneous workloads in a cloud datacenter, Journal of Network and Computer Applications—Oct. 2014.

T. M. Nguyen et al., A Comprehensive Resource Management and Placement for Network Function Virtualization, 978-1-5090-(i008-5/17/S31.00 @2017 IEEE.

International Search Report and Written Opinion for PCT application No. PCT/IB2019/057747, mailing date of Jan. 10, 2020.

* cited by examiner

METHOD FOR APPLYING A PENALTY TO A CLOUD SERVICE PROVIDER FOR IMPROVED MAINTENANCE OF RESOURCES ACCORDING TO A SERVICE LEVEL AGREEMENT (SLA)

CROSS-REFERENCE TO RELATED APPLICATIONS

This application claims the benefit of U.S. Provisional Application No. 62/864,096 filed on Jun. 20, 2019 and of PCT application PCT/IB2019/056340 filed Jul. 24, 2019.

TECHNICAL FIELD

Embodiments of the invention relate to the management of resource upgrades in a cloud environment.

BACKGROUND

In the Infrastructure as a Service (IaaS) cloud service model, there are three types of resources: physical resources, virtualization facilities (also called virtualization resources) and virtual resources (also called virtualized resources). The physical resources are the hardware of the infrastructure on which the rest of this layer is running. Virtual resources are resources provided as services built on top of the physical resources by using the virtualization facilities.

During their life-cycle, these resources are upgraded multiple times. The service delivered by the IaaS layer may be affected during these upgrades. Some systems have limited tolerance for service interruption. Some of these systems or their subsystems have a requirement of High Availability (HA), e.g. their services should be available 99.999% of the time: in other words, should not experience a downtime of more than five minutes and 26 seconds per year including downtime due to upgrade. Indeed, a cloud provider is committed to a tenant by a Service Level Agreement (SLA), which indicates the terms of commitment, e.g. the level of availability even during upgrades.

There are several challenges for maintaining availability during upgrades of the IaaS. In the IaaS layer as well as in other layers, resources may depend on other resources. Breaking any of the dependencies between resources during upgrades may cause service outages during the upgrades. Moreover, in the upgrade process, incompatibilities that do not exist in the current or in the target configuration may arise during the transition and break the dependencies. Additionally, upgrade actions performed on the resources may fail and such failures may jeopardize the consistency of the system configuration.

The dynamicity of cloud systems introduces additional challenges for upgrades. Cloud systems adapt to workload changes by provisioning and de-provisioning resources automatically according to the workload variations. This mechanism is referred to as autoscaling or elasticity. This dynamicity poses a challenge for maintaining the SLAs during upgrades. Indeed, the autoscaling feature may interfere with the upgrade process in different ways. The service capacity of the system decreases during the upgrade when resources are taken out of service for the upgrade. In the meantime, the system may need to scale out in response to workload increase. Furthermore, the autoscaling may undo or hinder the process of the upgrade when scaling-in releases newly upgraded resources (e.g. VMs), or when scaling-out uses the old (i.e. not yet upgraded) version of the resources. Therefore, for many conventional systems the autoscaling feature is disabled during the upgrade.

SLA violation penalties are formulated in different ways by different cloud providers. In the literature, two penalty metrics are proposed to be used in clouds: delay-dependent and proportional. The delay-dependent penalty is proportional to the delay which occurred in providing the required capacity and it is calculated by multiplying the SLA violation duration to an agreed penalty rate of $q_d$ (per unit of time). The proportional penalty is a form of delay-dependent penalty, where the penalty is proportional to the delay which occurred in providing the required capacity and the difference between a user's provisioned capacity and the expected allocation. It is calculated by multiplying an agreed penalty rate of $q_p$ (per unit capacity per unit of time), the duration of SLA violations, and the difference in the expected and provisioned capacity. Other methods have also been suggested which measure the availability itself and associate a penalty in relation to that.

One problem with the penalty metrics of the literature is that they do not properly motivate service availability. If only the time is considered for which some service is not available, as in the delay dependent penalty, then the penalty is the same whether all or some of the expected resources are unavailable. If proportional penalty is considered, still the penalty is the same whether all the resources (e.g. 10 VMs) are not available simultaneously for a given time (e.g. 5 minutes) or if each of the resources are not available consecutively for the same amount of time. In each case the penalty is the number of resources multiplied by the time and the rate. But considering the availability of the services, obviously, if no resources are provided at all, then no service is available. On the other hand, if those resources are taken out of service one at a time, the service is available at a degraded level and the service user may be able to cope with such a degradation. When the penalty calculation is based on availability measures, the calculation of availability itself becomes a complexity especially when service degradation needs to be considered.

SUMMARY

There is provided a method for applying a penalty to a cloud service provider, while upgrading resources in a system providing infrastructure-as-a-service (IaaS), for improved maintenance of resources according to a service level agreement (SLA). The method comprises iteratively: detecting a change in a number of expected resources or a number of provided resources: and upon determining that a previous unavailability (UA) event was ongoing, the UA event being characterized by a computed difference between the number of expected resources and the number of provided resources being greater than zero, calculating the penalty for the previous UA event using a quadratic proportional function. The method also comprises computing a total penalty as the sum of the penalties for each previous UA event: and applying the total penalty to the cloud service provider of the IaaS.

There is provided a method for upgrading resources in a system providing infrastructure-as-a-service (IaaS) in an iterative upgrade process. The method comprises receiving an upgrade request indicating requested changes to a current configuration of the system: identifying one or more resources to upgrade in a current iteration, based on dependencies and service level agreement (SLA) requirement, the SLA including availability, elasticity of the system and a penalty for outage of the resources, wherein calculating the penalty comprises using a quadratic proportional function: and executing the upgrade of the one of more resources in the current iteration.

There is provided a network node for upgrading resources in a system providing infrastructure-as-a-service (IaaS) in an iterative upgrade process. The network node comprises processing circuitry: and memory operative to: receive an upgrade request indicating requested changes to a current configuration of the system: identify one or more resources to upgrade in a current iteration, based on dependencies and service level agreement (SLA) requirement, the SLA including availability, elasticity of the system and a penalty for outage of the resources, wherein calculating the penalty comprises using a quadratic proportional function: and execute the upgrade of the one of more resources in the current iteration.

Other aspects and features will become apparent to those ordinarily skilled in the art upon review of the following description of specific embodiments in conjunction with the accompanying figures.

DETAILED DESCRIPTION

Figure 1:
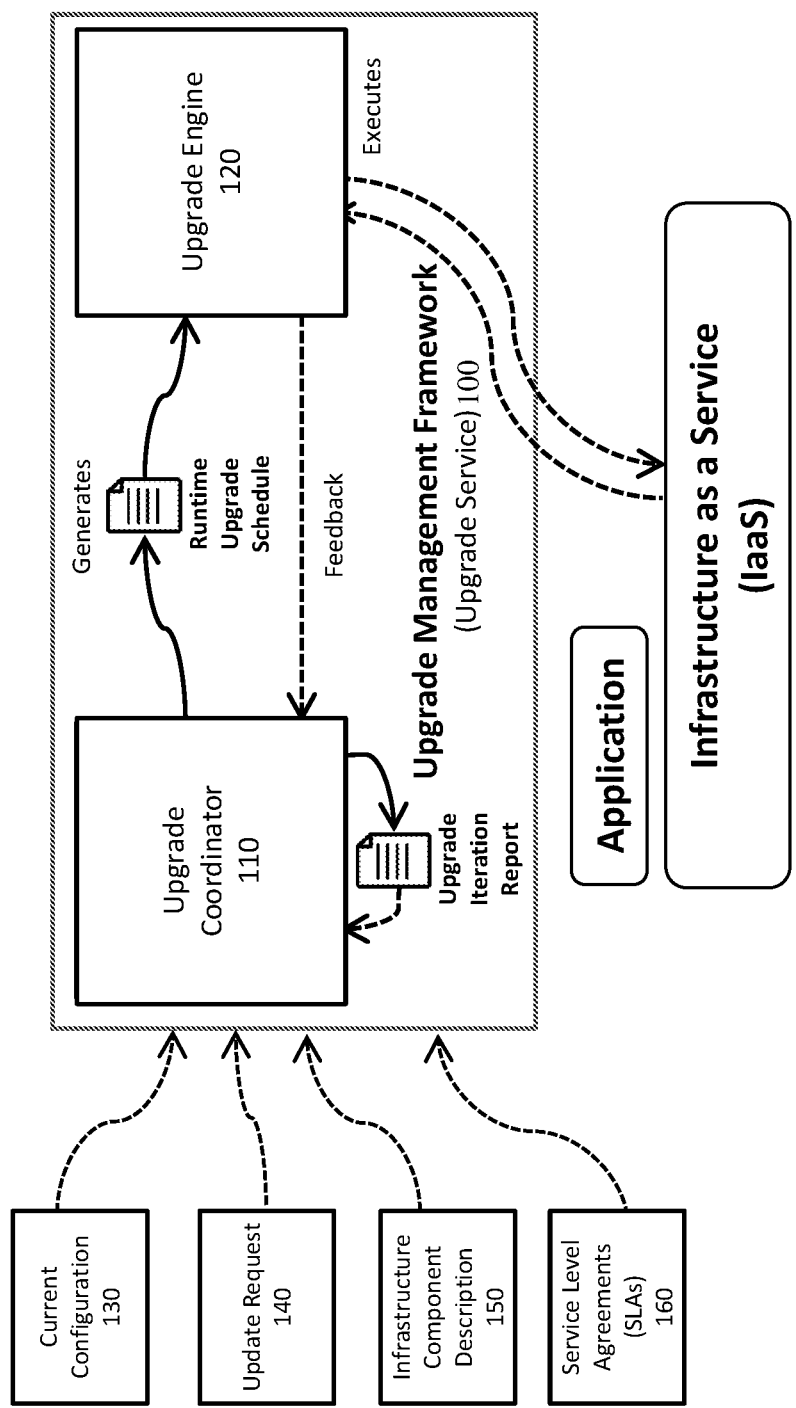
FIG. 1 illustrates an example upgrade management framework for the upgrade of IaaS cloud systems.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

It is helpful to start by explaining some terminologies used throughout the disclosure. An infrastructure component is a piece of software, firmware, or hardware delivered by a vendor as part of a product. The product itself can be a single component (e.g. ESXi hypervisor) or a compound product consisting of different components (e.g. Ceph storage with different components). When a product is fully installed in the IaaS system, this installation becomes a resource (e.g. ESXi hypervisor, Ceph storage) and may consist of the installation of multiple components. Thus, multiple IaaS resources can be mapped to the same infrastructure component (e.g. ESXi hypervisor installed on different hosts) and multiple infrastructure components can be mapped to a single IaaS resource (e.g. Ceph storage with components running on different hosts). Each infrastructure component is accompanied with a file, the infrastructure component description, which describes among others the component's service capabilities, configuration constraints, hardware management capabilities, delivering software/firmware bundle with their installation/upgrade/removal scripts/commands, estimated time required for their installation/removal, and hardware/software dependencies.

Next, the terms "actions," "operations" and "units" are explained. To deploy a change in the IaaS cloud system, one or more upgrade actions may need to be executed. An upgrade action is defined as an atomic action that can be executed by a configuration management tool (e.g. Ansible) on a resource (e.g. a command for installing ESXi on a host) or performed by an administrator on a resource (e.g. removing a host). An upgrade action is associated with one or more undo actions. Undo actions revert the effect of the upgrade actions on the resource. The term upgrade operation is used to represent an ordered list of upgrade actions. The term undo operation is used to represent an ordered list of undo actions; while a retry operation is defined as a retry of an upgrade operation. A recovery operation is defined as undo and/or retry operations.

An upgrade unit is defined as a group of resources that have to be upgraded using an appropriate upgrade method, for example, for handling the incompatibilities, which may arise during the upgrade: i.e. during the transition from the source configuration to the target configuration. The resources of an upgrade unit are selected based on the possible incompatibilities along the dependencies of the resources. The upgrade operations of the resources in an upgrade unit are ordered based on the associated upgrade method, which prevents communication between incompatible versions during the upgrade. An undo unit consists of a group of resources on which an upgrade operation has to be applied all together. Otherwise, the undo operation is triggered. The goal of this grouping is to preserve the consistency of the system configuration with respect to the changes to the IaaS cloud system.

The system administrator initiates an upgrade by specifying an upgrade request, which is a collection of change sets, i.e. a set of change sets. Each change set in the collection specifies a set of tightly coupled changes on the IaaS resources that either succeed or fail together to maintain the consistency of the system configuration. Within each change set, each change indicates the addition, removal, or upgrade of an infrastructure component of some resources, some resources themselves, or a dependency between two resources or their sets. Note that the change sets in an upgrade request are independent of each other, and a failure of a change set does not impact the consistency of the system with respect to other change sets.

A system administrator may not be aware of all the dependencies and, therefore, may not specify all the necessary changes in a change set, i.e. a change set may be incomplete. To satisfy the hardware and/or software dependencies indicated in the infrastructure component description by the vendor, an upgrade request initiated by a system administrator may require complementary changes. To address this issue, the completeness of each change set is checked with respect to the infrastructure component description(s) provided by the vendor(s) to decompose the request and derive any missing changes. These decompositions and missing changes are then added as complementary changes to the same change set. For each change, the necessary upgrade actions have to be derived from the infrastructure component description. The description contains the scripts used, for example, to install, remove, activate or deactivate a software component, while for a hardware component the scripts are used for its management.

The administrator can also specify additional parameters in the upgrade request with respect to retry and undo operations. To ensure the completion of the upgrade process, i.e. limit its time, for each change set a max-retry threshold and a max-completion-period can be specified. To ensure the consistency of the system for each change (in a change set), an undo-threshold parameter and an undo version can be specified. The usage of these four parameters will be described in detail later in the disclosure.

An upgrade request model may be used to keep track of upgrade requests. This model includes all the information necessary to track the process of applying the changes to the system including failure handling. The execution status of change sets and of changes within each set indicates whether they are new, scheduled, completed, or failed. Whenever a new upgrade request is issued, its change sets, including their respective complementary changes, are added to the upgrade request model. For each change in each change set, the target resources, their source, target and undo versions are reflected, and the execution status is maintained. The target resources and their source versions are identified from the current configuration.

There are many challenges for maintaining availability during IaaS cloud upgrades: (1) dependency of the application (SaaS) layer on the IaaS layer, (2) resource dependencies, (3) potential incompatibilities along the dependencies during the upgrade process, (4) upgrade failures, (5) the dynamicity of the cloud environment, and (6) keeping the amount of additional resources at minimum.

The challenge of dynamicity of the cloud environment is described here in more details. To handle the interferences between autoscaling and the upgrade process, the pace of the upgrade process is regulated. To respect the SLA commitments (scaling and availability), in each iteration the current configuration of the system is taken into consideration and only a certain number of resources can be taken out of service for upgrade. Based on the current configuration, it is determined in each iteration the number of resources necessary for accommodating the current service workload, for any potential scaling out requests, and for recovering from potential failures calculated for the duration of that iteration. These cannot be upgraded without potential violation of availability. So, from the initial batch of resources selected with respect to their dependencies, these resources are eliminated and only the remaining subset can be upgraded. This remaining subset is referred to as the final batch. The upgrade process starts/resumes if and only if at least one resource can be taken out (i.e. the final batch is not empty) and upgraded without violating the availability and elasticity constraints due to potential resource failures or valid scaling requests. Otherwise, the upgrade process is suspended until there is enough resources freed up, for example, through the process of scaling in.

The challenge of minimizing the amount of required additional resources is described here in more details. Since upgrade takes out resources from the system providing additional resources temporarily to the system may become necessary for progressing with the upgrade. The amount may depend on the upgrade method, the number of resources the upgrade is applied to and the spare capacity in the system at the moment it is applied. It may be necessary to add resources to enable the use of certain techniques to maintain service continuity and service availability especially in the presence of incompatibilities. Some of the existing upgrade solutions use the parallel universe method to avoid incompatibilities. Applying the parallel universe method at the system level is expensive in terms of resources. The idea is to use only the minimum necessary additional resources to keep the cost of the upgrade as low as possible. The disclosed method identifies the subsystem where additional resources are required, and only uses the minimum amount necessary.

FIG. 1 illustrates an upgrade management framework 100 for the upgrade of IaaS cloud systems according to one embodiment. Among others, the framework 100 takes into account the SLA constraints of availability and elasticity. The framework 100 includes two main components, an upgrade coordinator 110 to coordinate the process of the upgrade, and an upgrade engine 120 to execute the upgrade actions necessary to deploy in the system the requested upgrade.

The upgrade coordinator 110 keeps track of the upgrade requests and decides about the upgrade process in an iterative manner. For each iteration it generates one or more Runtime Upgrade Schedule(s), each of which is a collection of upgrade actions and the set of resources on which they need to be applied. The runtime upgrade schedule is generated to overcome the challenges described previously in this disclosure. The upgrade coordinator 110 uses as input the current configuration 130 of the system, the change sets indicated in the upgrade request(s) 140, the infrastructure component descriptions 150 provided by the vendors, and SLAs 160 of the existing tenants as input to generate the schedule.

To generate the upgrade schedules for each iteration, the upgrade coordinator 110 takes into account the dependencies, potential incompatibilities, and SLA constraints for availability and elasticity, as well as actions necessary for handling failures of previous iterations. Resource level failures are handled within a given iteration, while system level failures are handled in subsequent iterations.

To keep track of the upgrade requests 140, the upgrade coordinator 110 creates an upgrade request model. This model includes the change sets including the complementary changes and their execution status for each upgrade request. Based on the infrastructure component descriptions 150, the upgrade coordinator 110 infers any complementary changes necessary to satisfy all the dependencies and it identifies all the upgrade actions needed to deploy the different change sets and generates the runtime upgrade schedule(s).

The upgrade engine 120, an engine capable of running upgrade actions on IaaS resources, executes the upgrade actions specified in the runtime upgrade schedule received from the upgrade coordinator 110. Note that in the case of hardware resources, the upgrade engine 120 may request administrative assistance for actions such as replacement of a piece of hardware. However, the upgrade engine 120 can bring the resources to the required state and signal when the assistance is necessary and on which piece of hardware.

After the execution of an upgrade schedule, the upgrade engine 120 provides feedback to the upgrade coordinator 110 indicating the results including any failed upgrade action. Based on this feedback, the upgrade coordinator 110 may create a new runtime upgrade schedule to handle the failed upgrade actions at the resource level, i.e. to bring them into a stable configuration. Once all failures are handled for the iteration, the upgrade coordinator 110 creates an Upgrade Iteration Report as an additional (to those used for the first iteration) input for the next iteration of the runtime upgrade schedule(s) generation. The upgrade iteration report indicates the failed and/or isolated-only resources and failed undo units of the iteration. Based on these, in the subsequent iteration(s) the upgrade coordinator can issue the retry or undo operations as appropriate at the system level considering all the relevant dependencies including those defined by the grouping of requested changes in the upgrade request.

This iterative approach also supports continuous delivery. That is, new upgrade requests may be requested at any time during an ongoing upgrade. The upgrade coordinator 110 takes into account these new upgrade requests, adds them to the upgrade request model, infers the complementary changes as necessary, and extracts the upgrade actions corresponding to the changes. The new requests will be applied to the system in subsequent iterations as applicable. The process continues until all outstanding upgrade requests have been handled.

Figure 2:
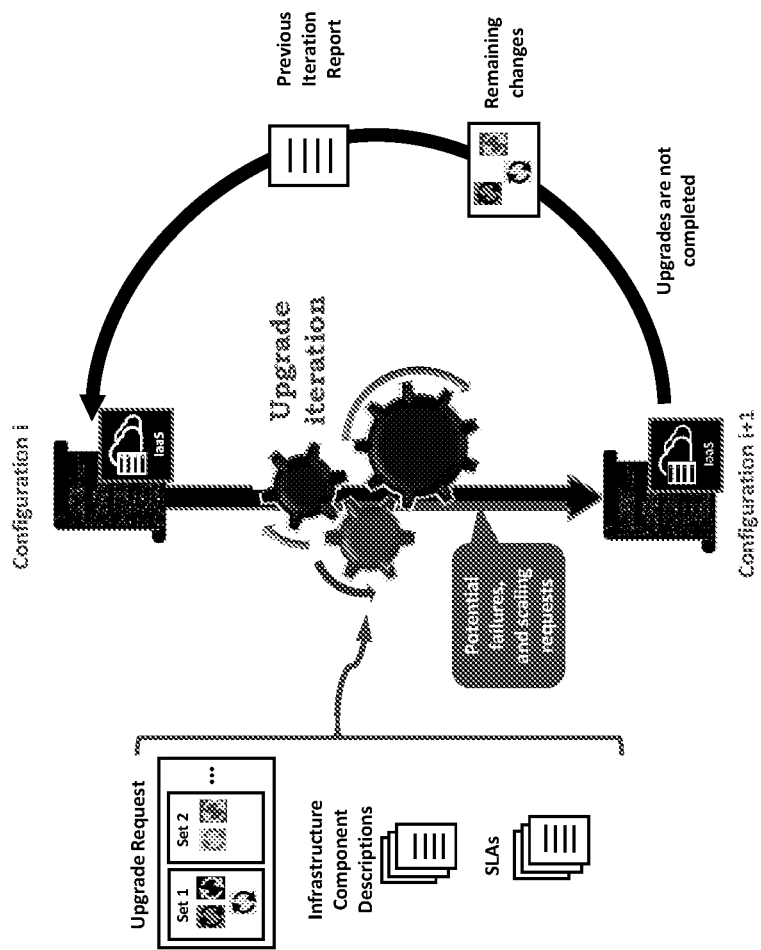
FIG. 2 illustrates an overall view of an iterative process of an example upgrade method.

The following is a detailed description of an IaaS upgrade method. To maintain availability the IaaS cloud system has to be upgraded using an iterative process. FIG. 2 illustrates an overall view of an iterative process of the upgrade method according to one embodiment. In each iteration, a current configuration (configuration i) is upgraded to an upgraded configuration (configuration i+1), taking the upgrade request, the infrastructure component descriptions and the SLAs as input. The previous iteration reports, if any, is also taken into account. The upgrade process handles potential failures and scaling requests. The iterative process continues if there are any remaining changes to be handled.

Figure 3:
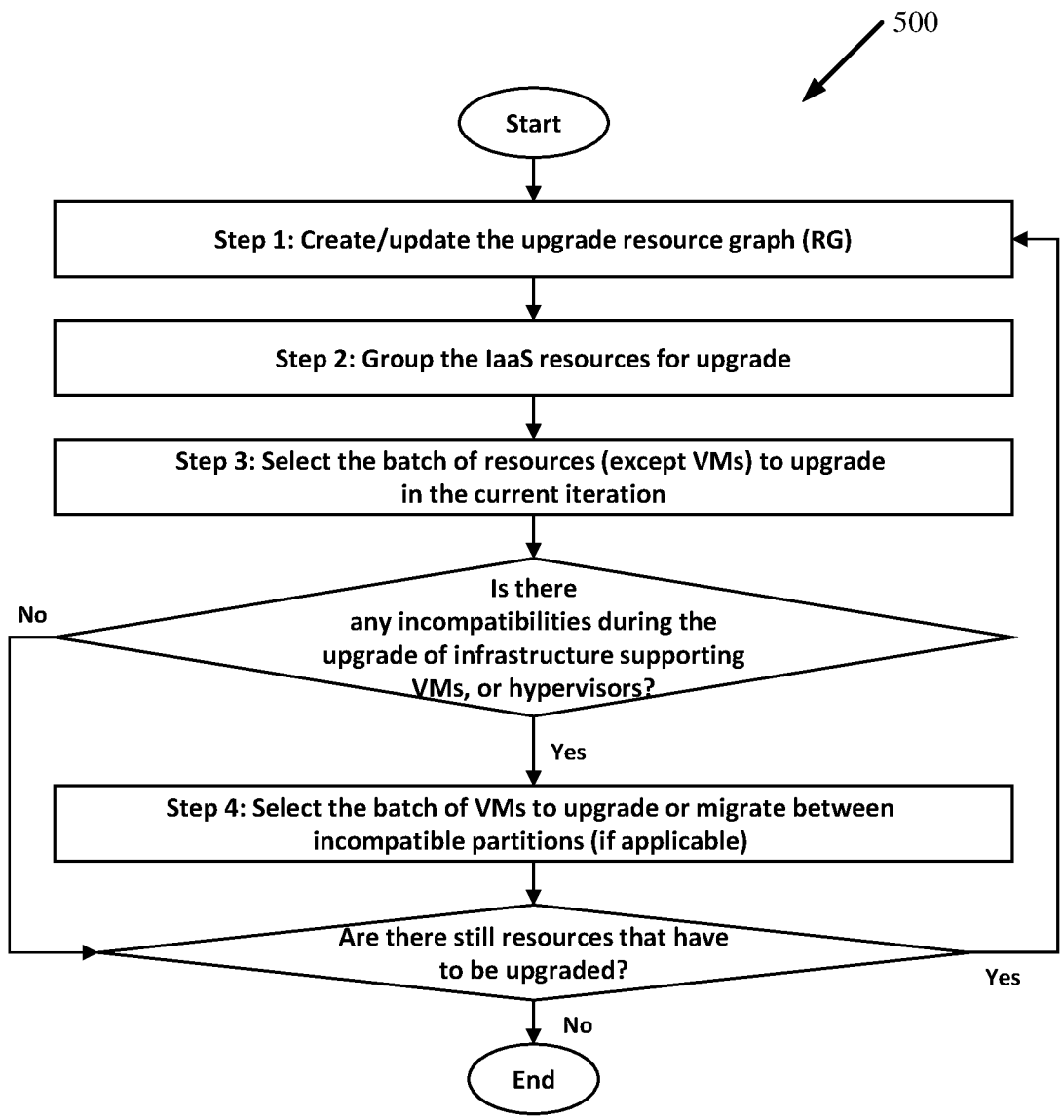
FIG. 3 is an example flow diagram illustrating the main steps of the iterative process of FIG. 2.

FIG. 3 is a flow diagram illustrating the main steps in each iteration of an iterative process 500 according to one embodiment. The four main steps include: step 1 to create/update the resource graph (RG): step 2 to group the IaaS resources for an upgrade: step 3 to select the batch of IaaS resources for the upgrade, and step 4 to select the batch of VMs for migration.

In each iteration, step 1 collects and organizes the information necessary for the upgrade of the IaaS resources by creating or updating the RG. This graph is created in the initial iteration and then updated in each subsequent one. The inputs for this step in the initial and in the subsequent iterations, while similar, are not the same. In the initial iteration, the RG is created according to the current configuration of the system, the requested change sets, and the infrastructure component descriptions provided by vendors. In a subsequent iteration, as additional inputs the upgrade request model is used reflecting the new and ongoing upgrade requests and the upgrade iteration report with the results of the previous iteration. Among others, the upgrade iteration report indicates any failed upgrade actions of the previous iteration together with the failed and isolated-only resources, based on which undo/retry operations can be initiated as necessary.

As mentioned earlier, the configuration of the system may also change between two subsequent iterations independent of the upgrade process, for example, due to live migrations, failures, and scaling in/out. Thus, in each iteration the RG is updated to reflect the current configuration of the system. The RG update also takes into account any new upgrade request for which complementary changes and appropriate upgrade methods are identified.

In step 2, from the RG, the resources that need to be upgraded at the same time are identified based on their dependencies and the selected upgrade methods. The vertices of these resources are merged and by that the RG is coarsened into an upgrade Control Graph (CG), where each vertex represents a resource group grouping one or more resources that need to be upgraded at the same time. A vertex of the CG preserves all the information of the vertices of the RG from which it was formed.

Thus, in step 3, first the IaaS resource groups that can be upgraded without violating any of their dependency compatibility requirements are selected to form an initial batch. However, because of SLA constraints may be only a subset of the initial batch can be upgraded in the iteration resulting in a final batch. Accordingly, a runtime upgrade schedule is generated consisting of the upgrade actions for the final batch. This upgrade schedule is sent to the upgrade engine for execution, which reports back the results. In case of a failure of an upgrade action, a new schedule may be generated right away to try to bring back the affected resources into a stable configuration using the undo actions of the upgrade actions already executed in the current iteration. It is noted that only upgrade actions of the same undo unit are relevant. If actions of more than one undo units have been executed, it may not be necessary to undo the actions of other undo units.

In step 4, the VMs hosted by the infrastructure are considered. Whenever during the upgrade the compute hosts have been partitioned, if appropriate, a batch of VMs is selected in this step for migration and possibly upgrade. Since the upgrade of both the VM supporting infrastructure resource and the hypervisor affect the compute hosts on which the VMs are hosted, while they are upgraded the IaaS compute hosts are partitioned into an old and a new partitions. If these upgrades do not necessitate VM upgrade, in step 4 a selected batch of VMs is migrated from the old partition to the new one. If VM upgrade is also necessary due to incompatibilities between the versions, then the VMs are also upgraded in the process. The selection of the batch of VMs takes into account the results of the previous step 3, i.e. the outcome of the execution of those upgrade schedule(s). To respect application level redundancy, the disclosed method may impact at a time only a limited number of VMS per anti-affinity group (one or as appropriate for the SLA). This means that the selected batch of VMs may need to be upgraded/migrated in sub-iterations. Thus, the upgrade coordinator generates an upgrade schedule for each sub-iteration. As in step 3, the upgrade coordinator sends each schedule to the upgrade engine for execution and based on feedback received generates the next schedule. If an upgrade action fails, the new upgrade schedule also includes the actions reversing the effects of completed upgrade actions for the failed action. The process continues until all the VMs in the selected batch have been handled. If the compute hosts are not partitioned, step 4 is skipped altogether.

Referring back to the upgrade coordinator 110 and the upgrade engine 120 of FIG. 1, in each iteration, the upgrade coordinator 110 generates several upgrade schedules. After the execution of each schedule, the upgrade engine 120 reports back to the upgrade coordinator 110 the results. At the resource level any failure is handled right away by the upgrade coordinator 110 by generating a new schedule to bring the resource into a stable configuration or to isolate it. Once resource level actions are not appropriate or necessary for the given iteration, the upgrade coordinator 110 updates the upgrade request model, the RG and the CG, and generates the upgrade iteration report to reflect the execution result of all schedules within that iteration. Then the upgrade coordinator 110 proceeds to the next iteration as appropriate.

The upgrade process terminates when all upgrade requests indicated in the upgrade request model have been handled and no new upgrade request has been received. This means that all change sets of all the upgrade requests received have been applied successfully or undone unless their target resources failed.

Each of the four steps in FIG. 3 is further elaborated with reference to FIG. 4.

Step 1 consists of creating/updating the resource graph. The tasks for creating/updating the RG in this step are indicated from Tasks 1 to 12 in flow diagrams 910 and 920 of FIG. 4A and FIG. 4B.

Step 2 consists of grouping the IaaS resources for upgrade. This is indicated in Task 13 in flow diagram 920 of FIG. 4B.

Step 3 consists of selecting the batch of IaaS resources for upgrade. The tasks for selecting the batch of IaaS resources are indicated from Tasks 14 to 21 in flow diagram 930 of FIG. 4C.

In step 3, task 17 provides how many compute hosts can be taken out, in such a way that the current workload with potential failovers and valid scale-out requests can be satisfied during the iteration. It also considers that in some cases the compute hosts are partitioned due to incompatibility between the old and new versions and accordingly failovers and scale-outs need to be satisfied in the correct partition.

With these, task 17 provides an upper limit for the final batch selection in task 18. Task 18 selects the final batch from the initial batch considering the upper limit calculated in task 17, i.e. it selects resources in such a way that the selection of resources should not impact directly or through their dependencies more than the upper limit of compute resources. The selection can be done in different ways and a penalty can be estimated for a given or for the different selections to find a best one.

Figure 4A:
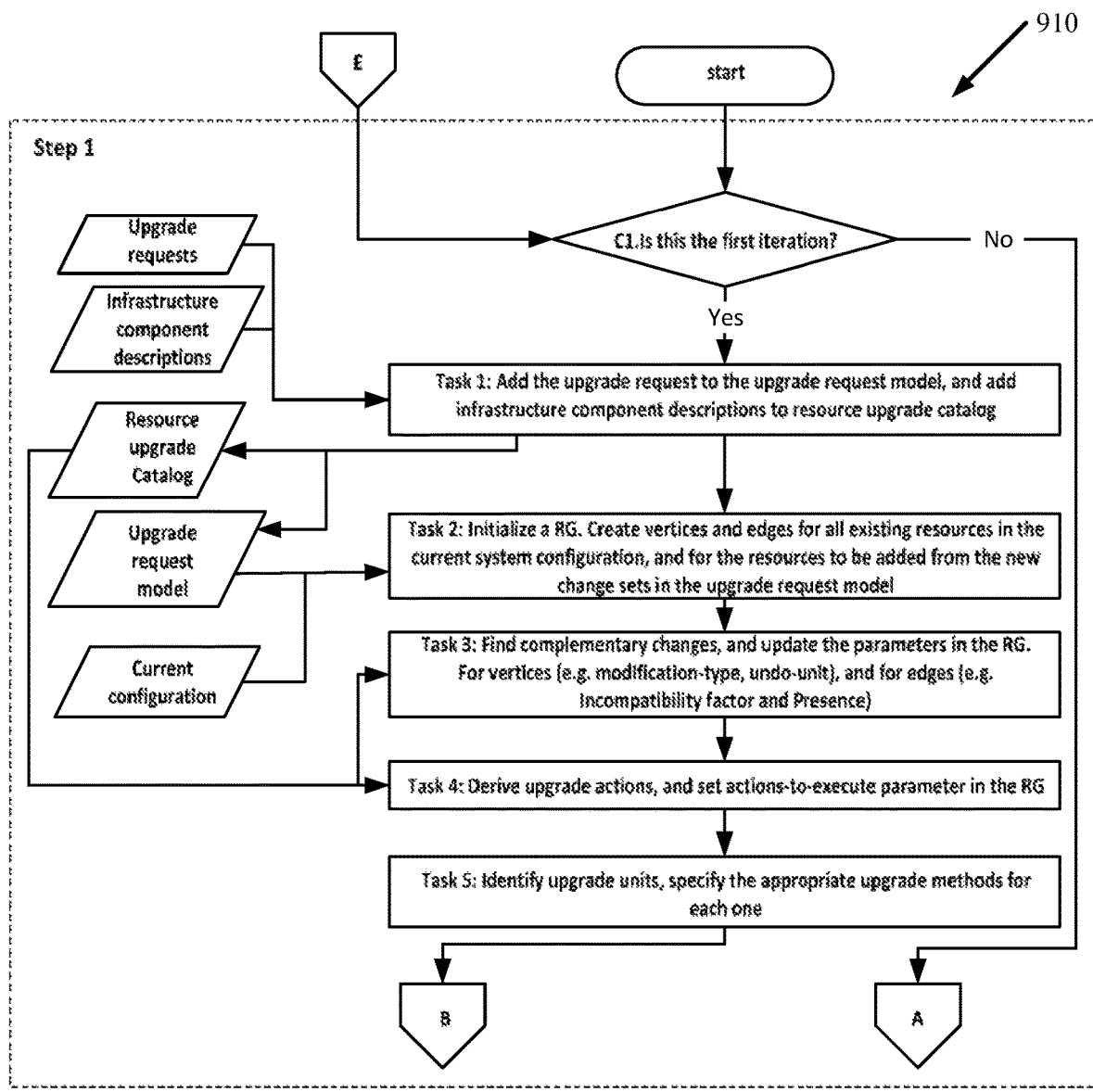
FIGS. 4A, 4B, 4C and 4D illustrate details of the example iterative process of FIG. 3.
Figure 4B:
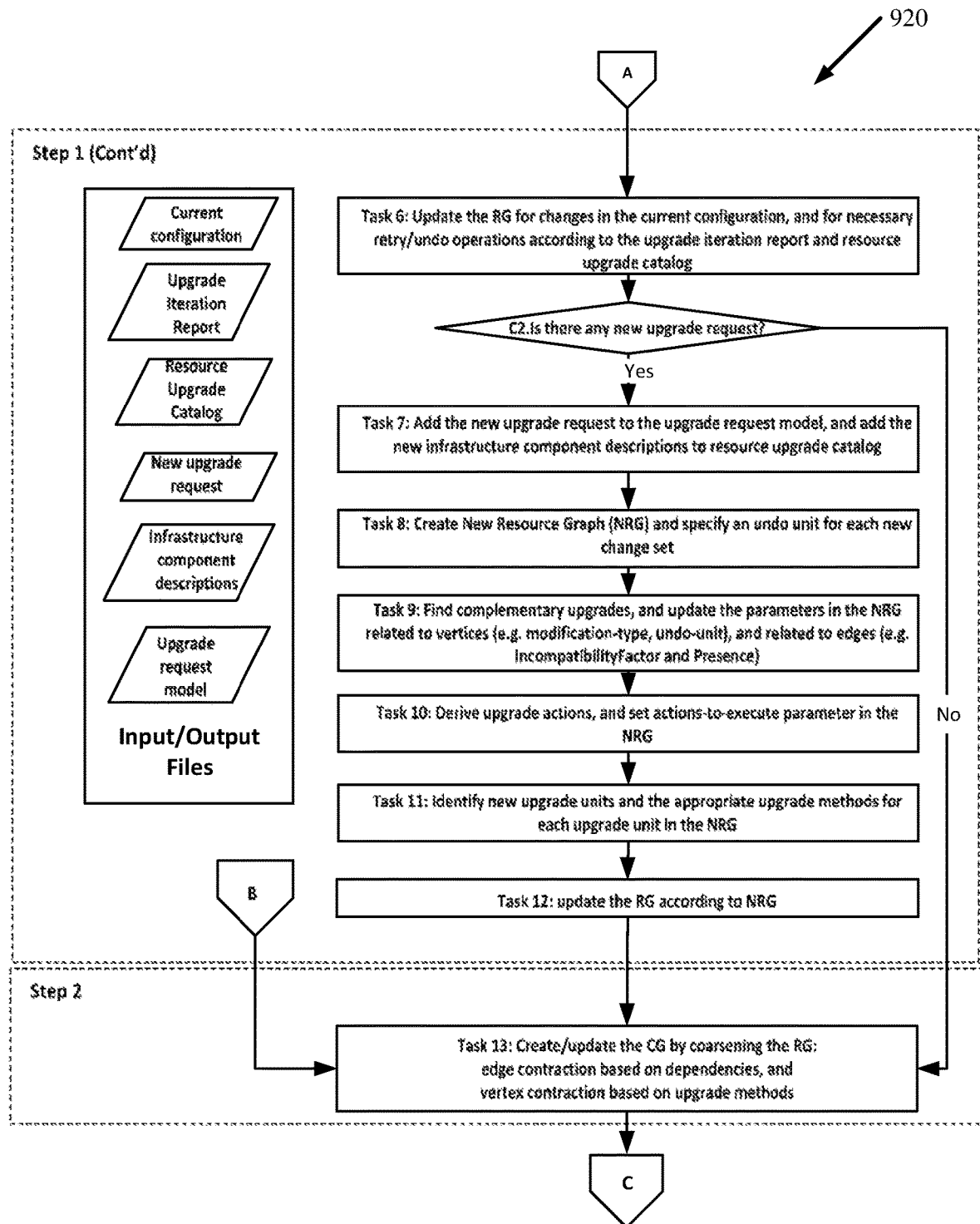
Figure 4C:
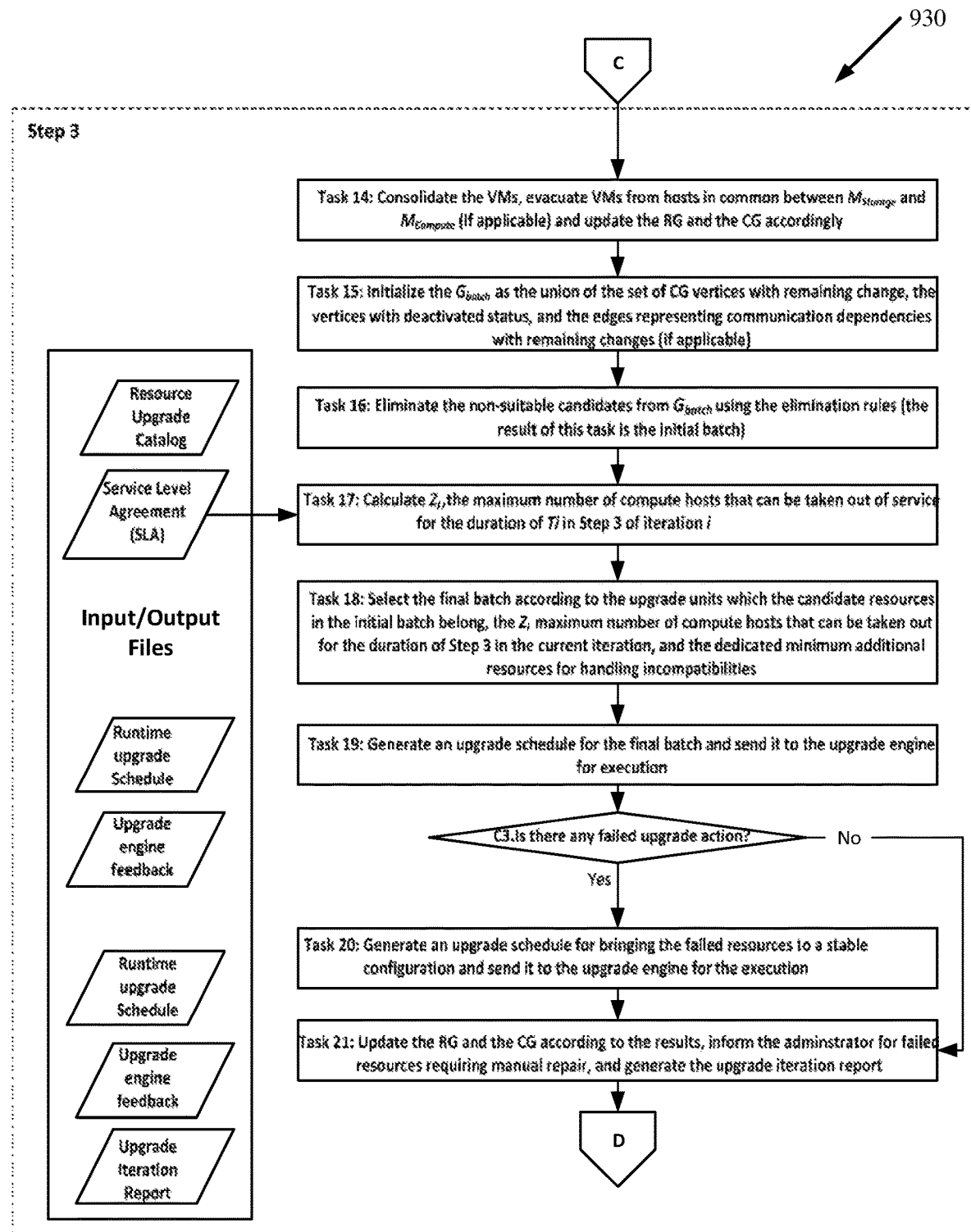
Figure 4D:
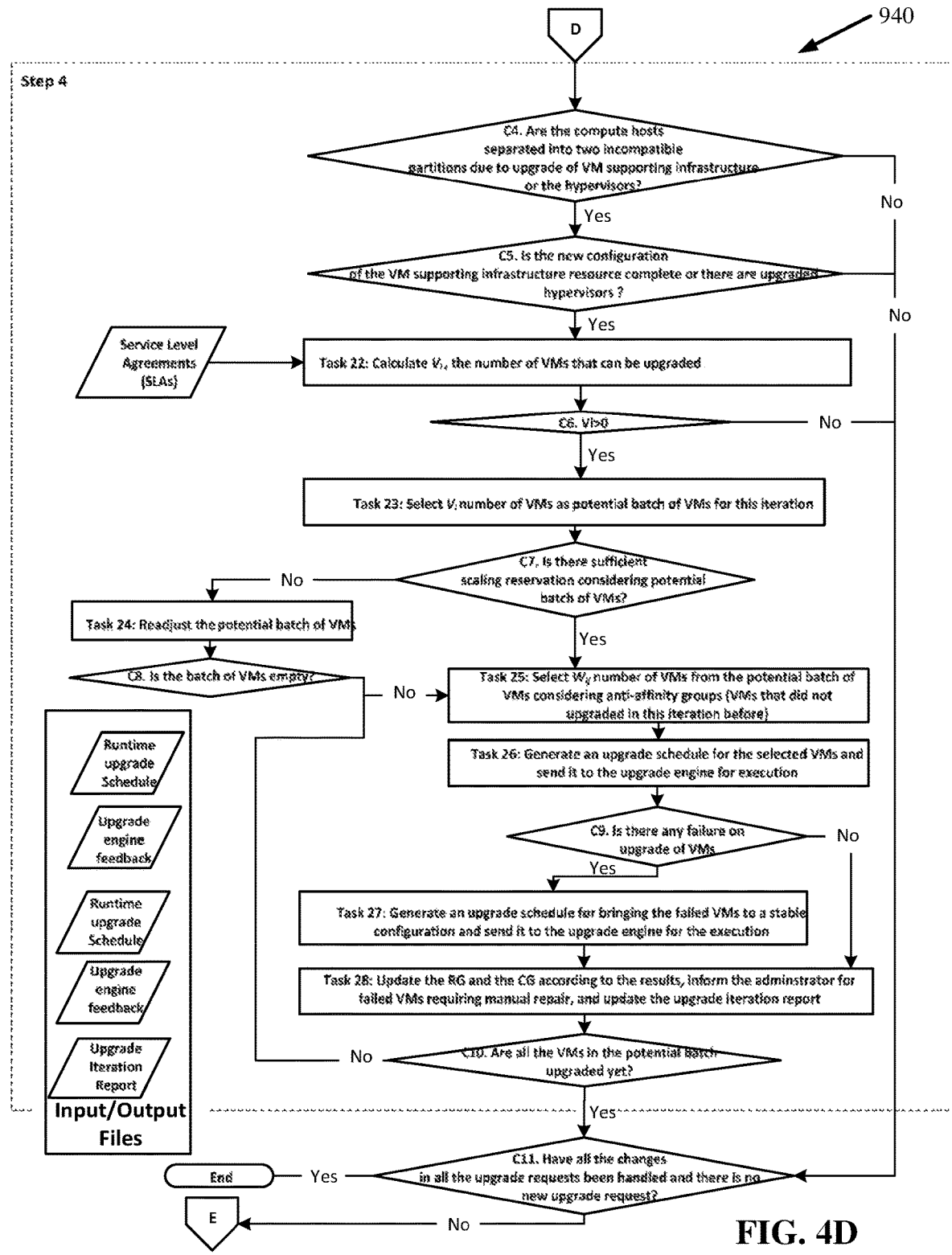

Step 4, FIG. 4D, consists of selecting the batch of VMs for migration.

Tasks 17 and 18, Step 3, of FIG. 4C can be improved with the use of a new method for estimating SLA penalty, using a quadratic proportional penalty function instead of using delay-dependent or proportional penalty computations as explained in the literature.

To motivate higher availability, with the new method, simultaneous unavailability of resources is penalized at a higher rate by making the penalty function proportional to the square of the simultaneously unavailable resources. Thus, additional units of resources unavailable simultaneously are counted at a higher and higher penalty rate.

Whenever the provided capacity of some resources is lower than their expected capacity, the SLA is violated and such a condition is referred to as an unavailability (UA) event. This may last for a period of time and may result in some penalty.

Figure 5:
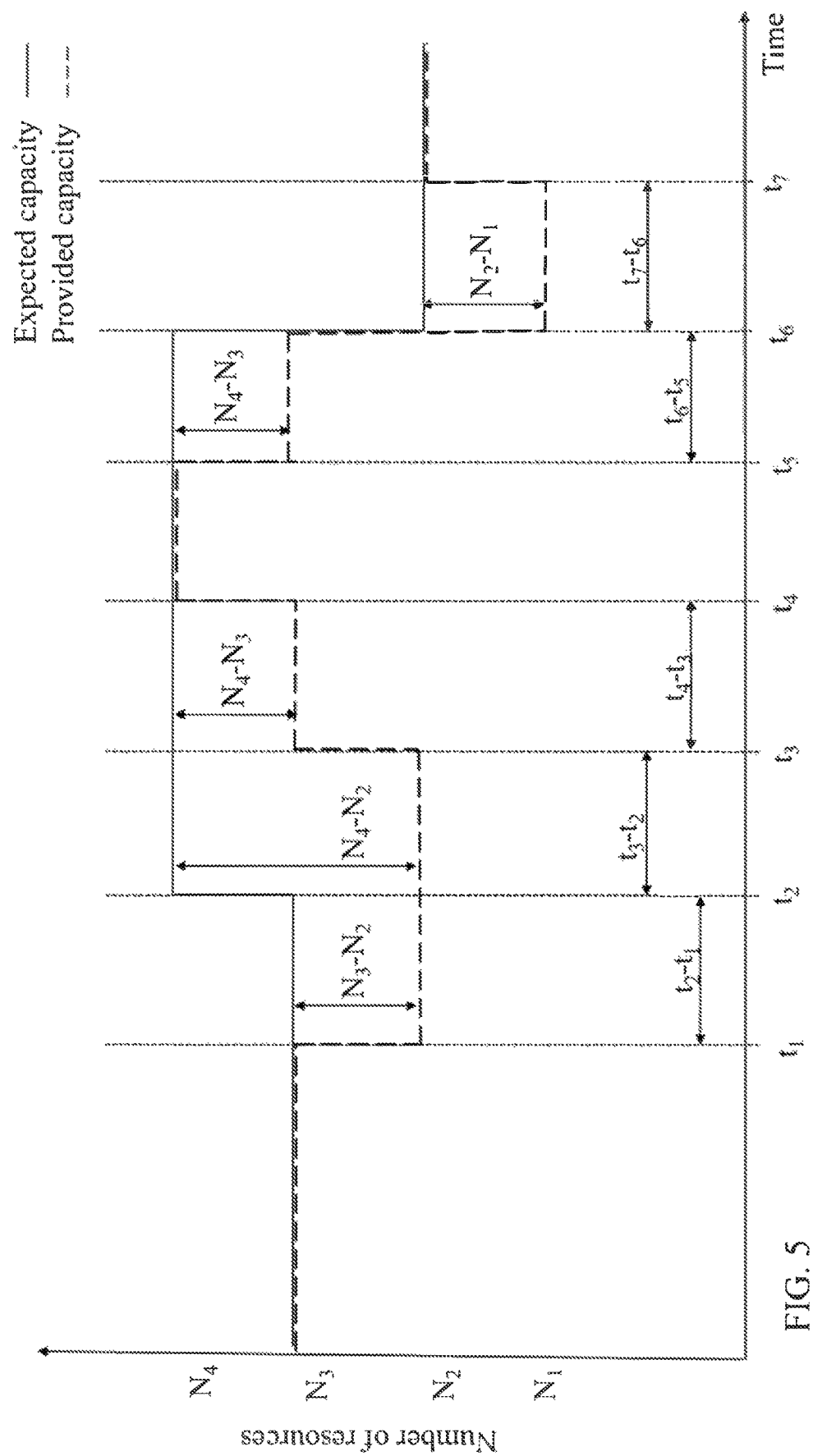
FIG. 5 illustrates an example of expected and provided resources over a time period

In FIG. 5, the horizontal solid line indicates the expected resource capacity, while the horizontal dashed line indicates the provided resource capacity. Each time there is a change in the expected or in the provided resource capacity, the amount of unavailable resource changes, hence these moments delineate the UA events. In FIG. 5, at time $t_1$ the number of provided resources drop from $N_3$ to $N_2$, thus there is an unavailability of $N_3$-$N_2$ units of resources for a period. At time $t_2$ the number of expected resources increase from $N_2$ to $Na$ increasing the unavailability of resources to $N_4$-$N_2$ units. I.e. $N_3$-$N_2$ is applicable to the period $t_2$-$t_1$ and at time $t_2$ a new period starts.

The amount of the penalty depends on the period for which the violation occurred, and on the amount of resources not provided, measured in some units for which the penalty rate has been agreed on in the SLA. Any time the expected or the provided capacity of resources changes, it indicates the end of the current and possibly the beginning of a new UA event.

Considering the above, for a period of time (e.g. a charging period), the penalty for SLA violations for a given resource can be calculated according to the following formula:

$$\text{Penalty}_R = q_R \sum_{i=1}^{n} (Tend_i - Tstart_i)(N\exp_i - Nprov_i)^2 \quad (1)$$

where
$q_R$ is the rate at which a given resource R unavailability is penalized per time unit, it may be the same for all kind of resources or it may be different for different resources;
$Tstart_i$ is the starting time of the $i^{th}$ UA event;
$Tend_i$ is the end time of the $i^{th}$ UA event;
$Nexp_i$ is the expected resource capacity to be provided for the period of the $i^{th}$ UA event;
$Nprov_i$ is the actually provided resource capacity during the period of the $i^{th}$ UA event;
n is the number of UA events that occurred during the time period for which the penalty is calculated. Whenever the number of expected (Nexp) or the number of provided (Nprov) resources changes it is counted as the end of a current UA event and possibly the beginning of a new UA event.
$\text{Penalty}_R$ is the total penalty for the resource R for the calculation period considered.

This means, for example, that if 10 VMs are expected to be provided, if all of these VMs are not available simultaneously in a given UA event and the unavailability of a VM per minute is penalized at rate q, then the calculated $\text{Penalty}_{VM}=q\times5$ mins$\times(10-0)^2$ which equals 500 q. In case these 10 VMs are taken out in sequence, the penalty calculation changes: there are 10 UA events counted with 1 VM missing in each for 5 mins. Thus, the total penalty is $\text{Penalty}_{VM}=10\times q\times5$ mins$\times(10-9)^2$ which equals 50 q. It should be noted that the resources need to be measured in such capacity units that the outage to be penalized gives a value greater or equal to 1 when using the formula (1).

It should also be noted that the exponent of 2 (i.e. quadratic) could be changed (increased or decreased, while still >1) if the penalty for simultaneous unavailability of a resource type is intended to be more or less severe. For example, the simultaneous unavailability of virtual disk may be penalized more severely using the power of 3 instead of 2, while the unavailability of network resources may be considered less severe and use the power of 1.5. Even if the term quadratic is used, as most of the time a power of 2 is used, "quadratic", in the context of this specification, is also meant to comprise powers of 1.5, 3 or any other suitable number.

This penalty calculation could also be part of a charging function where the penalties are calculated for the actually occurred UA events and such penalties would offset the charges for the same period of time.

Figure 6:
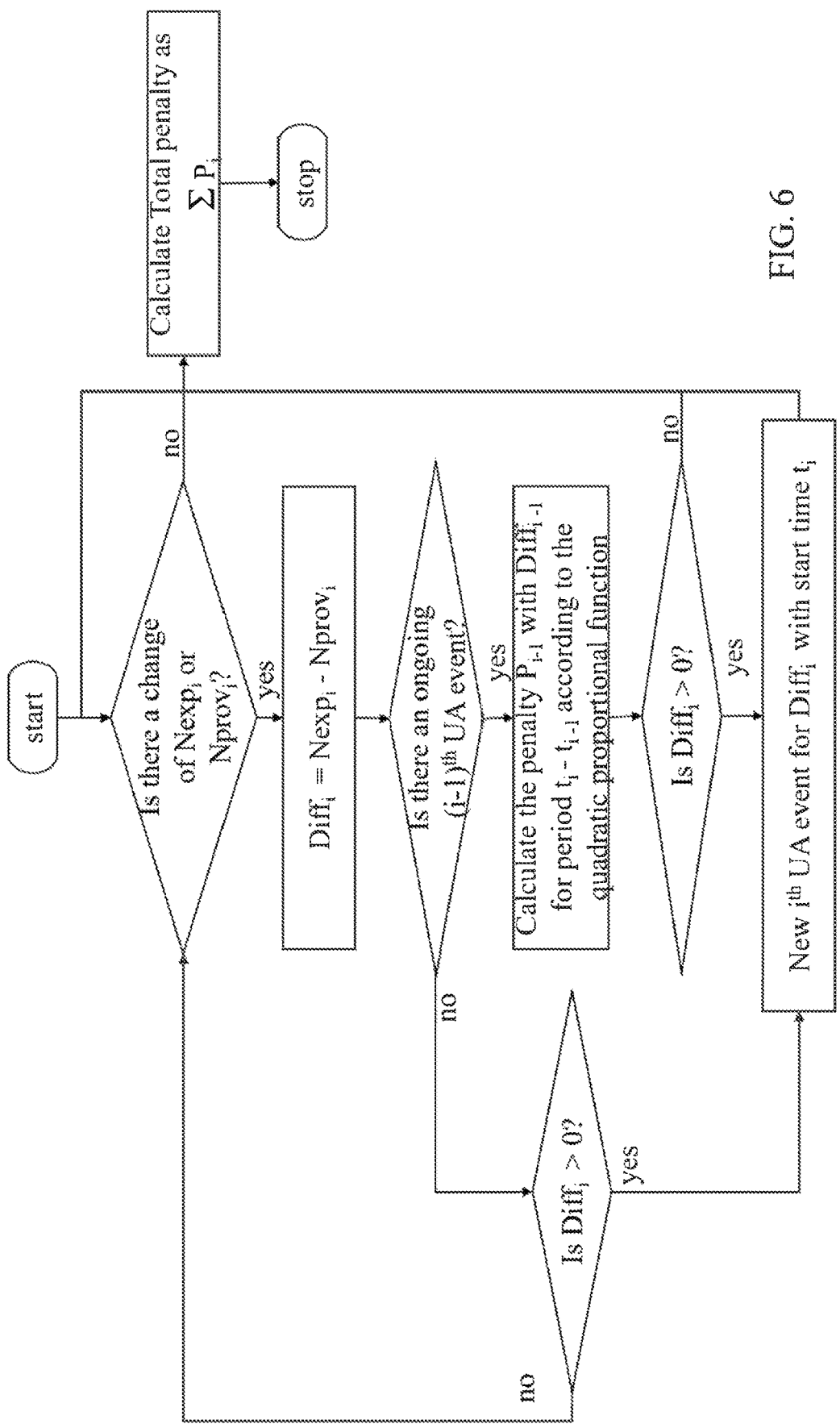
FIG. 6 illustrates a flowchart of penalty calculation for a period of time.

The penalty calculation for a period of time can be performed according to the flow chart of FIG. 6. Whenever there is a change in the expected or provided capacity there is a check if there is an ongoing UA event. If there is no ongoing UA event and the difference between the expected and provided capacity is not positive, then no penalty is applicable and there is a move (or waiting for) to process the next change. If the difference between the expected and provided capacity is positive, then a new UA event is detected, which starts at the current time $t_1$. The start time of the UA event and the current $Diff_i$ difference, which corresponds to $Nexp_i-Nprov_i$ in formula (1) need to be remembered to be able to compute the penalty $P_i$ when we detect the next change indicating the end time of the UA event, which will be $t_{i+1}$.

If there was an ongoing UA event, when the change in the expected or provided capacity was detected, then this change ends the ongoing event and may start a new event. Accordingly, the penalty $P_{i-1}$ is calculated for the just completed UA event using the quadratic proportional penalty function (1) with the remembered UA event start time and difference, which are, at this point, $t_{i-1}$ and $Diff_{i-1}$. If the new difference $Diff_i$ is positive a new UA event is also started.

The process continues until all the changes in the expected or provided capacities are processed for the given period of time, at which point the total penalty applicable for the period can be calculate by summing up all of the calculated penalties $P_i$.

Tables I and II below shows the application of the proposed penalty function to an example of unavailability of VMs due to the upgrade of infrastructure resources according to the upgrade method illustrated in FIG. 4, which uses dynamic batch sizes according to the final batch selection in task 18, and the rolling upgrade method with a fixed batch size commonly used to upgrade cloud resources. Two scenarios A and B are considered. In Scenario A, five rolling upgrades are considered with batch sizes 1, 2, 3, 4, and a dynamic batch size which is re-calculated according to task 17 and task 18 in each iteration. The UA events are counted with respect to the hosted VMs. Scenario B is similar, but more VMs are hosted, therefore only batch sizes 1, 2, 3, and the dynamic batch size are considered.

The tables for scenarios A and B compare the proportional penalty function proposed in the literature with the new quadratic proportional penalty function.

In both tables the next to the last column shows the penalty payable per tenant on average according to the proportional penalty function. This shows that, in both scenarios the rolling upgrade with the highest batch size (4 for scenario A and 3 for B), which on average introduces higher VM unavailability but for a shorter duration, the penalty is less than then for smaller batch sizes which introduce smaller VM unavailability but for longer time. This suggests that, by using penalty calculation method of the literature, performing the upgrade via system shut down causing total system outage actually penalizes less the infrastructure provider than using a rolling upgrade method which maintain the services available although degraded.

Contrary to this, the last column shows for both scenarios that using the quadratic proportional penalty function penalizes more if more VMs are unavailable simultaneously, such as in case of rolling upgrades with the highest batch sizes, even for a shorter period of time, which is what is wanted to maintain service availability.

TABLE I

SLA VIOLATION RELATED MEASUREMENT RESULTS FOR ALL POSSIBLE BATCH SELECTIONS FOR EVALUATION SCENARIO A

| Method/ approach | Total duration of upgrade (seconds) | Number of SLA violations per tenant Min | Max | Number of impacted VMs per tenant in each SLA violation Min | Max | average total duration of SLA violation per tenant (seconds) | Applicable proportional penalty per tenant | Applicable quadratic proportional penalty per tenant |
|---|---|---|---|---|---|---|---|---|
| Batch Size 1 | 548.00 | 2 | 6 | 1 | 1 | 2.25 | 2.25 q | 2.25 q |
| Batch Size 2 | 287.14 | 2 | 4 | 1 | 2 | 1.69 | 2.62 q | 2.98 q |
| Batch Size 3 | 226.43 | 1 | 3 | 1 | 2 | 1.35 | 1.99 q | 3.54 q |
| Batch Size 4 | 175.57 | 1 | 2 | 1 | 2 | 1.24 | 1.93 q | 3.56 q |
| Dynamic Batch Size | 192.69 | 1 | 3 | 1 | 1 | 1.35 | 1.35 q | 1.35 q |

TABLE II

SLA VIOLATION RELATED MEASUREMENT RESULTS FOR ALL POSSIBLE BATCH SELECTIONS FOR EVALUATION SCENARIO B

| Method/ approach | Total duration of upgrade (seconds) | Number of SLA violations per tenant Min | Max | Number of impacted VMs per tenant in each SLA violation Min | Max | average total duration of SLA violation per tenant (seconds) | Applicable proportional penalty per tenant | Applicable quadratic proportional penalty per tenant |
|---|---|---|---|---|---|---|---|---|
| Batch Size 1 | 582.50 | 5 | 8 | 1 | 1 | 3.38 | 3.38 q | 3.38 q |
| Batch Size 2 | 300.29 | 3 | 4 | 1 | 2 | 2.20 | 3.11 q | 4.86 q |
| Batch Size 3 | 226.43 | 2 | 3 | 1 | 3 | 1.53 | 2.96 q | 6.55 q |
| Dynamic Batch Size | 361.92 | 3 | 5 | 1 | 1 | 2.25 | 2.25 q | 2.25 q |

Figure 7:
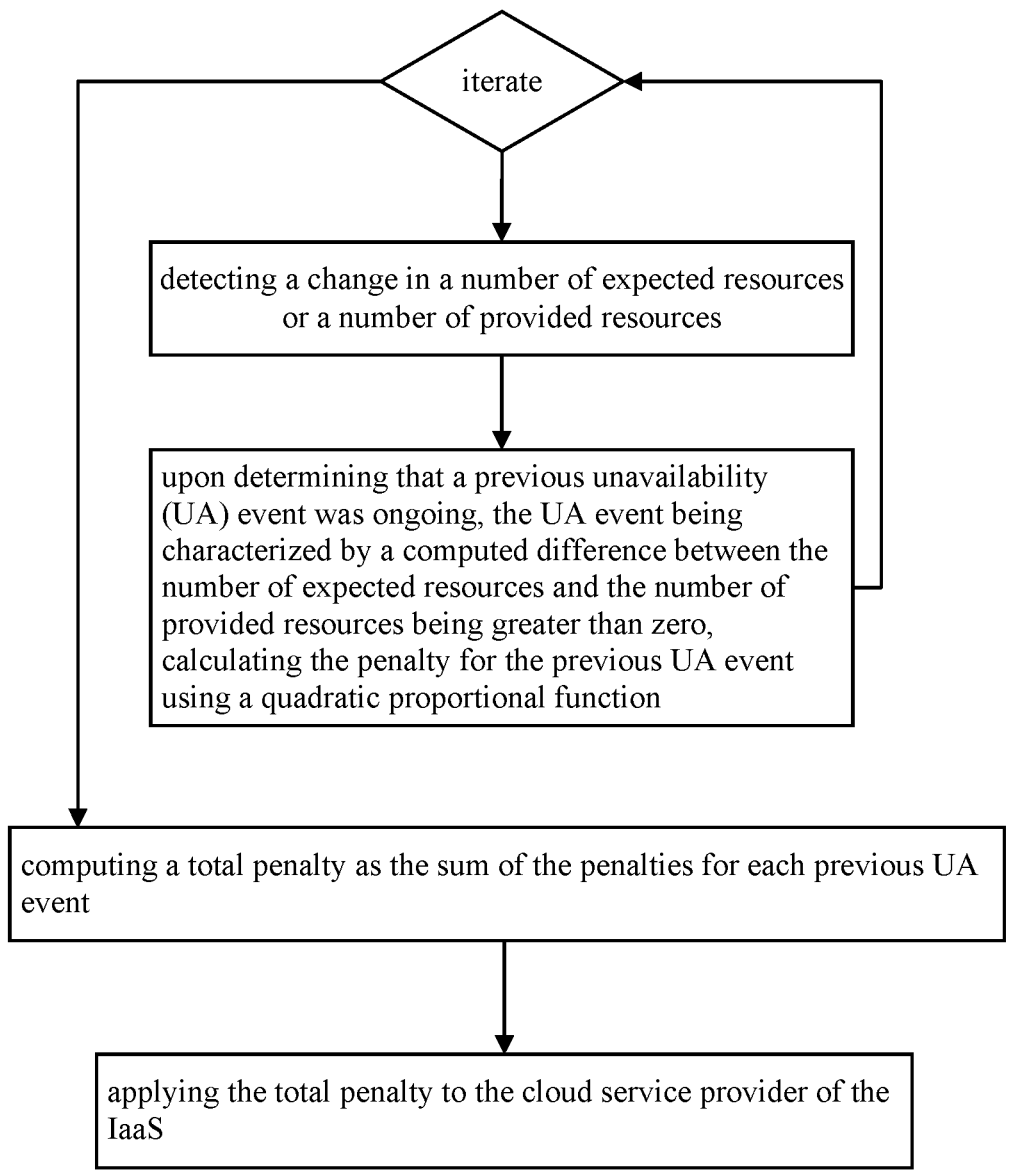
FIG. 7 is a flowchart of a method for applying a penalty to a cloud service provider, while upgrading resources in a system providing infrastructure-as-a-service (IaaS), for improved maintenance of resources according to a service level agreement (SLA).

FIG. 7 is a flow diagram illustrating a method for applying a penalty to a cloud service provider, while upgrading resources in a system providing infrastructure-as-a-service (IaaS), for improved maintenance of resources according to a service level agreement (SLA). The method comprises iteratively: detecting a change in a number of expected resources or a number of provided resources: and upon determining that a previous unavailability (UA) event was ongoing, the UA event being characterized by a computed difference between the number of expected resources and the number of provided resources being greater than zero, calculating the penalty for the previous UA event using a quadratic proportional function. The method also comprises computing a total penalty as the sum of the penalties for each previous UA event: and applying the total penalty to the cloud service provider of the IaaS.

Detecting the change in the number of expected resources may comprise comparing the number of expected resources at a previous time $t_{i-1}$ and at a current time $t_i$.

Detecting the change in the number of provided resources may further comprise comparing the number of provided resources at the previous time $t_{i-1}$ and at the current time $t_1$. The previous UA event may be an event that started at the previous time $t_{i-1}$ and ended at the current time $t_1$. The penalty of a previous UA event may be calculated by multiplying the square of the difference between the number of expected resources and the number of provided resources with a total time of the previous UA event and by a penalty rate.

Figure 8:
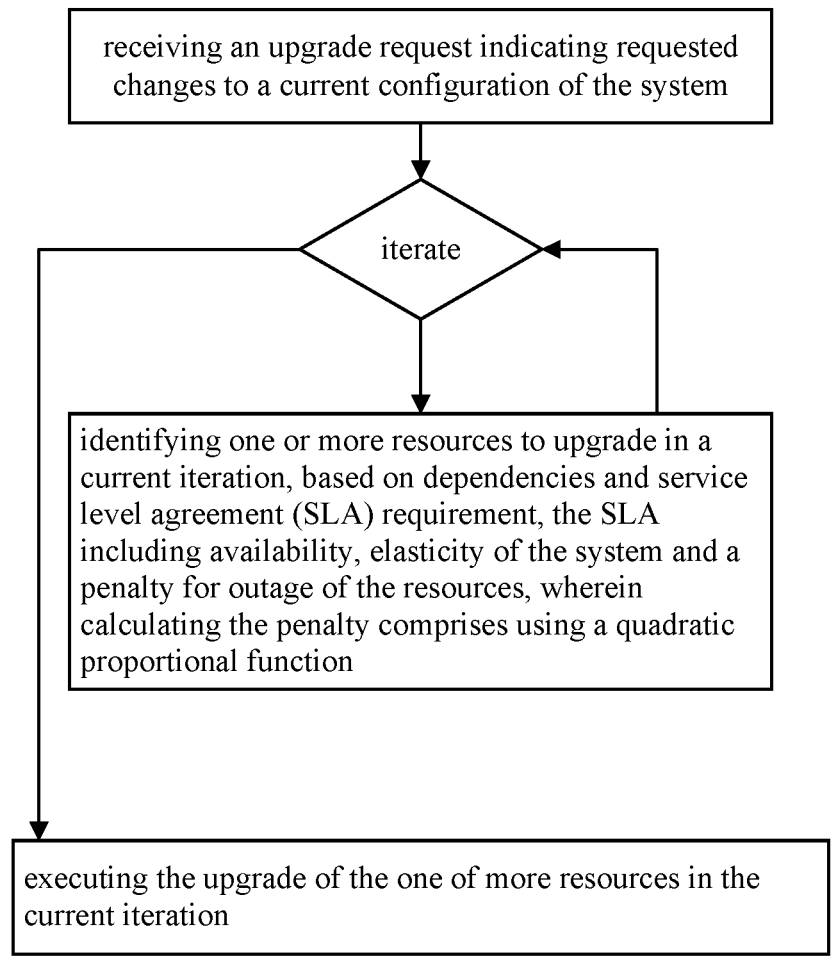
FIG. 8 is a flowchart of a method for upgrading resources in a system providing infrastructure-as-a-service (IaaS) in an iterative upgrade process.

FIG. 8 is a flow diagram illustrating a method for upgrading resources in a system providing infrastructure-as-a-service (IaaS) in an iterative upgrade process. The method comprises receiving an upgrade request indicating requested changes to a current configuration of the system: identifying one or more resources to upgrade in a current iteration, based on dependencies and service level agreement (SLA) requirement, the SLA including availability, elasticity of the system and a penalty for outage of the resources, wherein calculating the penalty comprises using a quadratic proportional function: and executing the upgrade of the one of more resources in the current iteration.

Calculating the penalty may comprise iteratively for a duration of the iterative upgrade process: detecting a change in a number of expected resources or a number of provided resources: upon determining that a previous unavailability (UA) event was ongoing, the UA event being characterized by a computed difference between the number of expected resources and the number of provided resources being greater than zero, calculating a penalty for the previous UA by multiplying the square of the difference between the number of expected resources and the number of provided resources with a total time of the previous UA event and by a penalty rate: and computing the penalty for outage of the resources as the sum of the penalties for each previous UA event for the duration of the iterative upgrade process.

Detecting the change in the number of expected resources may comprise comparing the number of expected resources at a previous time $t_{i-1}$ and at a current time $t_i$. Detecting the change in the number of provided resources may comprise comparing the number of provided resources at the previous time $t_{i-1}$ and at the current time $t_1$. The previous UA event may be an event that started at the previous time $t_{i-1}$ and ended at the current time $t_i$.

Figure 9:
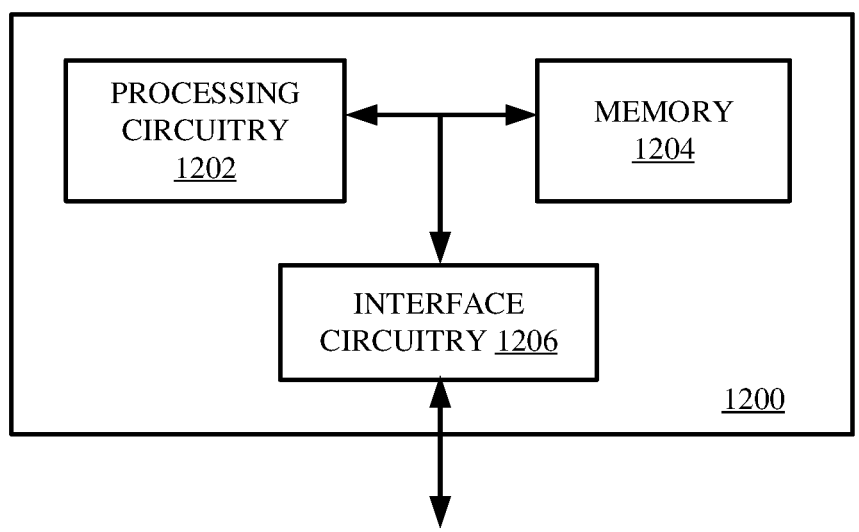
FIG. 9 is a block diagram of an example network node.

FIG. 9) is a block diagram illustrating a network node 1200 according to an embodiment. In one embodiment, the network node 1200 may be a server in an operator network or in a data center. The network node 1200 includes circuitry which further includes processing circuitry 1202, a memory 1204 or instruction repository and interface circuitry 1206. The interface circuitry 1206 can include at least one input port and at least one output port. The memory 1204 contains instructions executable by the processing circuitry 1202 whereby the network node 1200 is operable to perform the various embodiments described herein.

Figure 10:
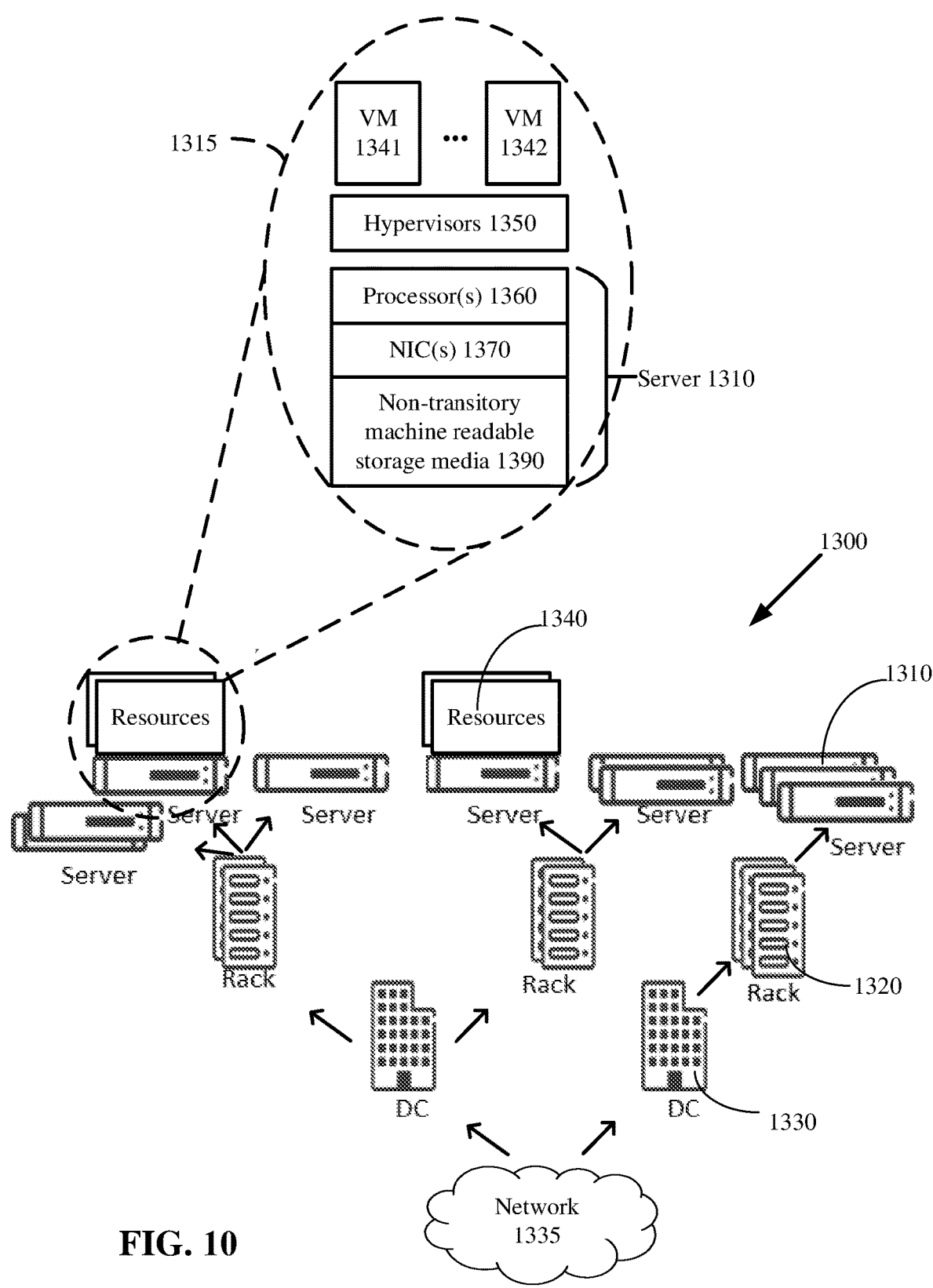
FIG. 10 is an architectural overview of an example cloud computing environment.

FIG. 10 is an architectural overview of a cloud computing environment 1300 that comprises a hierarchy of cloud computing entities. The cloud computing environment 1300 can include a number of different data centers (DCs) 1330 at different geographic sites connected over a network 1335. Each data center 1330 site comprises a number of racks 1320, each rack 1320 comprises a number of servers 1310. It is understood that in alternative embodiments a cloud computing environment may include any number of data centers, racks and servers. A set of the servers 1310 may be selected to host resources 1340. In one embodiment, the servers 1310 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead. Each of the servers 1310, the VMs, and the containers within the VMs may be configured to perform the various embodiments as have been described herein.

Further details of the server 1310 and its resources 1340 are shown within a dotted circle 1315 of FIG. 13, according to one embodiment. The cloud computing environment 1300 comprises a general-purpose network device (e.g. server 1310), which includes hardware comprising a set of one or more processor(s) 1360, which can be commercial off-the-shelf (COTS) processors, dedicated Application Specific Integrated Circuits (ASICs), or any other type of processing circuit including digital or analog hardware components or special purpose processors, and network interface controller(s) 1370 (NICs), also known as network interface cards, as well as non-transitory machine-readable storage media 1390 having stored therein software and/or instructions executable by the processor(s) 1360.

During operation, the processor(s) 1360 execute the software to instantiate a hypervisor 1350 and one or more VMs 1341, 1342 that are run by the hypervisor 1350. The hypervisor 1350 and VMs 1341, 1342 are virtual resources, which may run node instances in this embodiment. In one embodiment, the node instance may be implemented on one or more of the VMs 1341, 1342 that run on the hypervisor 1350 to perform the various embodiments as have been described herein. In one embodiment, the node instance may be instantiated as a network node performing the various embodiments as described herein.

Embodiments may be represented as a software product stored in a machine-readable medium (such as the non-transitory machine-readable storage media 1390, also referred to as a computer-readable medium, a processor-readable medium, or a computer usable medium having a computer readable program code embodied therein). The non-transitory machine-readable medium 1390 may be any suitable tangible medium including a magnetic, optical, or electrical storage medium including a diskette, compact disk read only memory (CD-ROM), digital versatile disc read-only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

Server or network node 1310 may be used for upgrading resources in a system providing infrastructure-as-a-service (IaaS) in an iterative upgrade process. Server or network node 1310 comprises processing circuitry: and memory. The memory is operative to: receive an upgrade request indicating requested changes to a current configuration of the system; identify one or more resources to upgrade in a current iteration, based on dependencies and service level agreement (SLA) requirement, the SLA including availability, elasticity of the system and a penalty for outage of the resources, wherein calculating the penalty comprises using a quadratic proportional function: and execute the upgrade of the one of more resources in the current iteration.

The processing circuitry may further be operative to: iteratively for a duration of the iterative upgrade process: detect a change in a number of expected resources or a number of provided resources: upon determining that a previous unavailability (UA) event was ongoing, the UA event being characterized by a computed difference between the number of expected resources and the number of provided resources being greater than zero, calculate a penalty for the previous UA by multiplying the square of the difference between the number of expected resources and the number of provided resources with a total time of the previous UA event and by a penalty rate: and compute the penalty for outage of the resources as the sum of the penalties for each previous UA event for the duration of the iterative upgrade process.

The change in the number of expected resources may be detected by comparing the number of expected resources at a previous time $t_{i-1}$ and at a current time $t_1$. The change in the number of provided resources may be detected comparing the number of provided resources at the previous time $t_{i-1}$ and at the current time $t_1$. The previous UA event may be an event that started at the previous time $t_{i-1}$ and ended at the current time $t_i$.

The above-described embodiments are intended to be examples only. Alterations, modifications and variations may be effected to the particular embodiments by those of skill in the art.

What is claimed is:

1. A method for applying a penalty to a cloud service provider, while upgrading resources in a system providing infrastructure-as-a-service (IaaS), for improved maintenance of resources according to a service level agreement (SLA), the method comprising:
   iteratively:
      detecting a change in a number of expected resources or a number of provided resources;
      upon determining that a previous unavailability (UA) event was ongoing, the UA event being characterized by a computed difference between the number of expected resources and the number of provided resources being greater than zero, calculating the penalty for the previous UA event by multiplying the square of the difference between the number of expected resources and the number of provided resources with a total time of the previous UA event and by a penalty rate;
   computing a total penalty as the sum of the penalties for each previous UA event; and
   applying the total penalty to the cloud service provider of the IaaS.

2. The method of claim 1, wherein detecting the change in the number of expected resources comprises comparing the number of expected resources at a previous time $t_{i-1}$ and at a current time $t_i$.

3. The method of claim 2, wherein detecting the change in the number of provided resources comprises comparing the number of provided resources at the previous time $t_{i-1}$ and at the current time $t_i$.

4. The method of claim 3, wherein the previous UA event is an event that started at the previous time $t_{i-1}$ and ended at the current time $t_i$.

5. A method for upgrading resources in a system providing infrastructure-as-a-service (IaaS) in an iterative upgrade process, comprising:
   receiving an upgrade request indicating requested changes to a current configuration of the system;
   identifying one or more resources to upgrade in a current iteration, based on dependencies and service level agreement (SLA) requirement, the SLA including availability, elasticity of the system and a penalty for outage of the resources,
   wherein calculating the penalty comprises;
   iteratively for a duration of the iterative upgrade process:
      detecting a change in a number of expected resources or a number of provided resources;
      upon determining that a previous unavailability (UA) event was ongoing, the UA event being characterized by a computed difference between the number of expected resources and the number of provided resources being greater than zero, calculating a penalty for the previous UA by multiplying the square of the difference between the number of expected resources and the number of provided resources with a total time of the previous UA event and by a penalty rate; and
      computing the penalty for outage of the resources as the sum of the penalties for each previous UA event for the duration of the iterative upgrade process; and
   executing the upgrade of the one of more resources in the current iteration.

6. The method of claim 5, wherein detecting the change in the number of expected resources comprises comparing the number of expected resources at a previous time $t_{i-1}$ and at a current time $t_i$.

7. The method of claim 6, wherein detecting the change in the number of provided resources comprises comparing the number of provided resources at the previous time $t_{i-1}$ and at the current time $t_i$.

8. The method of claim 7, wherein the previous UA event is an event that started at the previous time $t_{i-1}$ and ended at the current time $t_i$.

9. A network node for upgrading resources in a system providing infrastructure-as-a-service (IaaS) in an iterative upgrade process, comprising:
   processing circuitry; and
   memory operative to:

receive an upgrade request indicating requested changes to a current configuration of the system;

identify one or more resources to upgrade in a current iteration, based on dependencies and service level agreement (SLA) requirement, the SLA including availability, elasticity of the system and a penalty for outage of the resources, wherein calculating the penalty comprises;

iteratively for a duration of the iterative upgrade process:

detect a change in a number of expected resources or a number of provided resources;

upon determining that a previous unavailability (UA) event was ongoing, the UA event being characterized by a computed difference between the number of expected resources and the number of provided resources being greater than zero, calculate a penalty for the previous UA by multiplying the square of the difference between the number of expected resources and the number of provided resources with a total time of the previous UA event and by a penalty rate; and compute the penalty for outage of the resources as the sum of the penalties for each previous UA event for the duration of the iterative upgrade process; and execute the upgrade of the one of more resources in the current iteration.

10. The network node of claim 9, wherein the change in the number of expected resources is detected by comparing the number of expected resources at a previous time $t_{i-1}$ and at a current time $t_i$.

11. The network node of claim 10, wherein the change in the number of provided resources is detected comparing the number of provided resources at the previous time $t_{i-1}$ and at the current time $t_i$.

12. The network node of claim 11, wherein the previous UA event is an event that started at the previous time $t_{i-1}$ and ended at the current time $t_i$.

* * * * *